United States Patent
Takeda et al.

(10) Patent No.: US 6,801,244 B2
(45) Date of Patent: Oct. 5, 2004

(54) OBSTACLE DETECTION APPARATUS AND METHOD

(75) Inventors: Nobuyuki Takeda, Kanagawa-ken (JP); Hiroshi Hattori, Tokyo (JP); Kazunori Onoguchi, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 539 days.

(21) Appl. No.: 09/779,619

(22) Filed: Feb. 9, 2001

(65) Prior Publication Data

US 2001/0019356 A1 Sep. 6, 2001

(30) Foreign Application Priority Data

Feb. 29, 2000 (JP) ................................ P2000-053825
Mar. 27, 2000 (JP) ................................ P2000-087470

(51) Int. Cl.⁷ ............................................. H04N 7/18
(52) U.S. Cl. ..................................... 348/119; 348/120
(58) Field of Search ................... 348/42–60, 116–121

(56) References Cited

U.S. PATENT DOCUMENTS

| | | | |
|---|---|---|---|
| 5,694,483 A | | 12/1997 | Onoguchi |
| 5,892,855 A | * | 4/1999 | Kakinami et al. .......... 382/291 |
| 6,157,876 A | * | 12/2000 | Tarleton et al. ............ 701/16 |
| 6,205,242 B1 | | 3/2001 | Onoguchi |

* cited by examiner

*Primary Examiner*—Andy Rao
(74) *Attorney, Agent, or Firm*—Oblon, Spivak, McClelland, Maier & Neustadt, P.C.

(57) ABSTRACT

A plurality of cameras respectively input an image from different camera positions. The plurality of cameras is on a moving object. An image memory stores a plurality of images input by the plurality of cameras. An image transformation unit transforms one image input by a first camera using each of a plurality of transformation parameters each representing a geometrical relationship among a predetermined plane, the first camera, and a second camera, and generates a plurality of transformed images from a view position of the second camera. A matching processing unit compares each of the plurality of transformed images with another image input by the second camera for each area consisting of pixels, and calculates a coincidence degree of each area between each transformed image and another image. An obstacle detection unit detects an obstacle area consisting of areas each having a coincidence degree below a threshold from another image.

21 Claims, 8 Drawing Sheets

LEFT IMAGE    RIGHT IMAGE

LEFT IMAGE    RIGHT IMAGE

OBSTACLE DETECTION APPARATUS AND METHOD

FIELD OF THE INVENTION

The present invention relates to an obstacle detection apparatus and a method for detecting an obstacle such as a preceding vehicle, a parked vehicle, or a pedestrian on a road using cameras on a vehicle.

BACKGROUND OF THE INVENTION

In order to realize safe driving or automatic driving of a vehicle, a technique to detect an obstacle is necessary. This technique is classified into a utilization of a laser or a supersonic wave, and a utilization of a TV camera. An apparatus using the laser is expensive. In an apparatus using the supersonic wave, resolution of the supersonic wave is low and detection accuracy of the obstacle is correspondingly low. Furthermore, an active sensor using the laser or the supersonic wave cannot recognize a driving lane of the vehicle. On the contrary, TV cameras are relatively inexpensive and have suitable resolution, instrumentation accuracy, and instrumentation limit. Furthermore, the driving lane is also recognized. In case of utilizing a TV camera, a method using one TV camera and a method using a plurality of TV cameras (stereo camera) are selectively used. In the method using one TV camera, a road area and an obstacle area are separated from one image taken by the one TV camera according to intensity, color, or texture information. For example, an intensity area of the average level whose brightness degree is low, i.e., a gray area, is extracted from the image as the road area. An area not including texture may be extracted from the image as the road area. The other area in the image is regarded as the obstacle area. However, many obstacles include intensity, color, or texture similar to the road. Accordingly, in this method, it is difficult to separate the obstacle area from the road area.

On the other hand, in the method using a plurality of cameras, the obstacle is detected based on three-dimensional information. In general, this method is called "stereo view". For example, two cameras are located at the left side and the right side; the same point in three-dimensional space is corresponded between the left image and the right image; and a three-dimensional position of the point is calculated by triangulation. If a position and a posture of each camera for a road plane are previously calculated, the height of an arbitrary point from the road plane in the image is calculated by the stereo view. In this case, the obstacle area is separated from the road area by the height. In the stereo view, a problem in case of utilizing one camera is avoided.

However, in regular stereo view, a problem such as search of correspondence points is included. In general, the stereo view is a technique to calculate a three-dimensional position of arbitrary point of the image in coordinate system fixed to the stereo camera (Hereinafter, it is called "stereo camera coordinate system"). The search for correspondence points represents search calculation necessary for correspondence of the same point in space between the left image and the right image. The calculation burden is extremely high. The search for correspondence points is a factor preventing realization of the stereo view.

In this case, if the road area and the obstacle area are simply separated in the image, the search for correspondence points is not always necessary. For example, the height of an area from the road plane is decided as follows. Assume that a projection point of the same point on the road plane to the left image and the right image is respectively (u, v), (u', v'). The following equation (1) is concluded.

$$u' = \frac{h11u + h12v + h13}{h31u + h32v + h33}, \quad v' = \frac{h21u + h22v + h23}{h31u + h32v + h33} \quad (1)$$

$\vec{h}$ =(h11, h12, h13, h21, h22, h23, h31, h32, h33): parameter of the camera dependent on a position and a posture on the road plane, a focal distance of lens of the camera, and the origin of the image.

"$\vec{h}$" is previously calculated by projection points (ui, vi), (ui', vi') (i=1, 2, ..., N) of at least four points on the road plane to the left image and the right image. By using the equation (1), in case that arbitrary point P (u, v) on the left image exists on the road plane, a correspondence point P' (u', v') on the right image is calculated. If the point P exists on the road plane, the points P and P' are a correct pair of correspondence points and intensities of the two points are equal. Accordingly, if an intensity of the point P is not equal to an intensity of the point P', the point P is decided to belong to the obstacle. In this method, the height of the arbitrary point in the image from the road plane is directly decided using the equation (1). Coefficients in the equation (1) are calculated by projection points of at least four feature points on the road to the left and right images. Accordingly, the search for correspondence points between the left and right images is not necessary.

If the vehicle is moving at low speed on a flat floor in an indoor environment, $\vec{h}$ is fixed. Therefore, the obstacle is correctly detected using $\vec{h}$ calculated once. However, if the vehicle is moving outdoors, relative posture of each camera on the road plane changes regularly because of vibration of the vehicle itself and changes in the inclination of the road. As a result, the parameter $\vec{h}$ of the camera changes in proportion to the movement of the vehicle. Therefore, if the parameter $\vec{h}$ calculated during a still moment of the vehicle is utilized, if the camera image is transformed by the equation (1), and if an obstacle is detected by subtracting the transformed image from another camera image, the detection accuracy extremely falls.

As mentioned-above, the obstacle detection apparatus is classified into a type using a laser or a supersonic wave (active), and another type using TV camera (passive). However, the obstacle detection apparatus using the laser or the supersonic wave is expensive, the instrumentation accuracy is low and the driving lane is not recognized. Furthermore, in the obstacle detection apparatus using a TV camera, a usable environment is restricted, the search for correspondence points whose calculation load is high is necessary, and the vibration of the vehicle while moving and the inclination of the road are not taken into consideration. As a result, the ability extremely falls in the outdoor environment.

SUMMARY OF THE INVENTION

It is an object of the present invention to provide an obstacle detection apparatus and a method for correctly detecting an obstacle on a plane even if the plane inclines or a plurality of cameras vibrate in case of detecting the obstacle by the plurality of cameras on a vehicle.

According to the present invention, there is provided an obstacle detection apparatus, comprising: a plurality of image input units configured to respectively input an image from at least two camera positions, said plurality of image input units being loaded on a moving object; an image memory configured to store a plurality of images input by said plurality of image input units; an image transformation unit configured to transform one image input by first image input unit using each of a plurality of transformation parameters each representing a geometrical relationship among a predetermined plane, the first, and a second image input units, and to generate a plurality of transformed images from a camera position of the second image input unit, each of the plurality of transformed images corresponding to each of the plurality of transformation parameters; a matching processing unit configured to compare each of the plurality of transformed images with another image input by the second image input unit for each area consisting of pixels, and to calculate a coincidence degree of each area between each transformed image and another image; and an obstacle detection unit configured to detect an obstacle area consisting of areas each of which coincidence degree is below a threshold from another image.

Further in accordance with the present invention, there is also provided an obstacle detection method, comprising the steps of: respectively inputting an image from at least two camera positions through a plurality of cameras loaded on a moving object; storing a plurality of input images; transforming one image input by a first camera using each of a plurality of transformation parameters each representing a geometrical relationship among a predetermined plane, the first camera, and a second camera; generating a plurality of transformed images from a camera position of the second camera; comparing each of the plurality of transformed images with another image input by the second camera for each area consisting of pixels; calculating a coincidence degree of each area between each transformed image and another image; and detecting an obstacle area consisting of areas each of which coincidence degree is below a threshold from another image.

Further in accordance with the present invention, there is also provided a computer-readable memory containing computer-readable instructions, comprising: an instruction unit to respectively input an image from at least two camera position through a plurality of cameras loaded on a moving object; an instruction unit to store a plurality of input images; an instruction unit to transform one image input by a first camera using each of a plurality of transformation parameters each representing a geometrical relationship among a predetermined plane, the first camera, and a second camera; an instruction unit to generate a plurality of transformed images from a camera position of the second camera; an instruction unit to compare each of the plurality of transformed images with another image input by the second camera for each area consisting of pixels; an instruction unit to calculate a coincidence degree of each area between each transformed image and another image; and an instruction unit to detect an obstacle area consisting of areas each of which coincidence degree is below a threshold from another image.

DETAILED DESCRIPTION OF THE PREFERRED EMBODIMENTS

Hereinafter, embodiments of the present invention are explained below with reference to the drawings. In the present invention, the stereo camera consisting of the left camera and the right camera is loaded on the vehicle. While the vehicle on which the stereo camera is loaded is running on the road, under a condition that the vibration of the vehicle and the inclination of the road change, an obstacle such as a pedestrian, or a preceding vehicle on the road, is detected. Hereinafter, the image input by the left camera is called the left camera image and the image input by the right camera is called the right camera image. Furthermore, hereinafter, an example that the left camera image is transformed based on a view position of the right camera is explained. However, the right camera image may be transformed based on a view position of the left camera. In the latter case, an effect similar to the former case is obtained.

Figure 1:
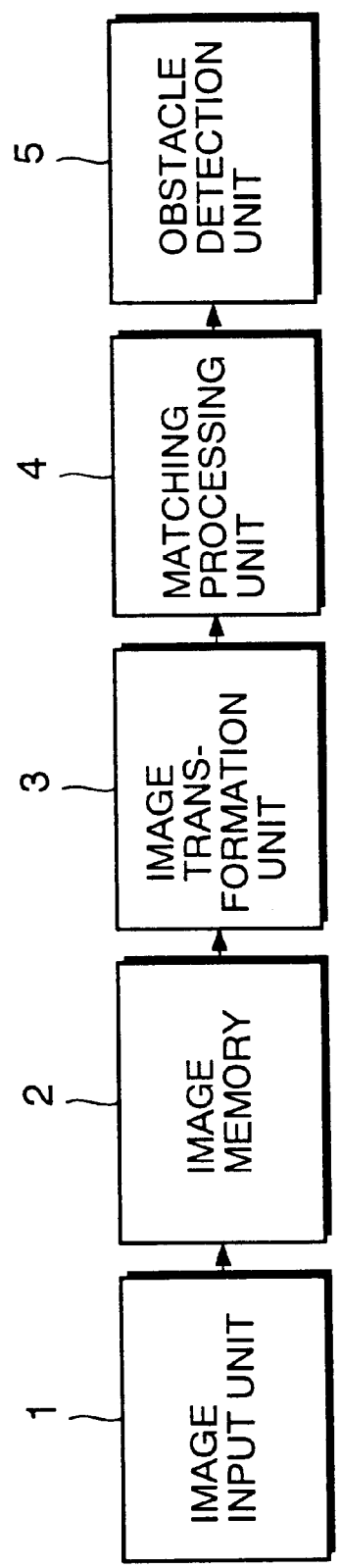
FIG. 1 is a block diagram of the obstacle detection apparatus according to the present invention.

FIG. 1 is a block diagram of the obstacle detection apparatus according to the present invention. An image input unit 1 inputs a stereo image of the area in front of the vehicle from a left camera and a right camera on the vehicle (in case of monitoring the rear, the stereo image of the rear area). An image memory 2 stores the left and right images. An image transformation unit 3 transforms one camera image input through one camera based on a view position of the other camera. A matching processing unit 4 executes a matching processing for the transformed image and the other camera image. An obstacle detection unit 5 detects the obstacle area according to the result of the matching processing.

In a first embodiment of the present invention, a transformation parameter used for image transformation is not changed/corrected while the vehicle is moving (in case of detecting the obstacle). The image transformation unit 3 utilizes a plurality of prepared transformation parameters. As a method to calculate the plurality of transformation parameters, a plurality of postures of the vehicle on the road are selected from posture range of the vehicle, and the transformation parameter of each posture is calculated by a geometrical relationship between the camera and the road plane (relative position between the camera and the road plane is called the posture). In short, the image transformation unit 3 transforms one camera image based on the view position of the other camera using each of the plurality of transformation parameters and generates a plurality of transformed images. The matching processing unit 4 executes the matching processing for each transformed image and the other camera image.

Before explaining the detailed processing of the obstacle detection apparatus of the first embodiment, the transformation of one camera image based on the view position of the other camera, which is guided from the geometrical relation among the road plane and the two cameras, is explained.

Figure 2:
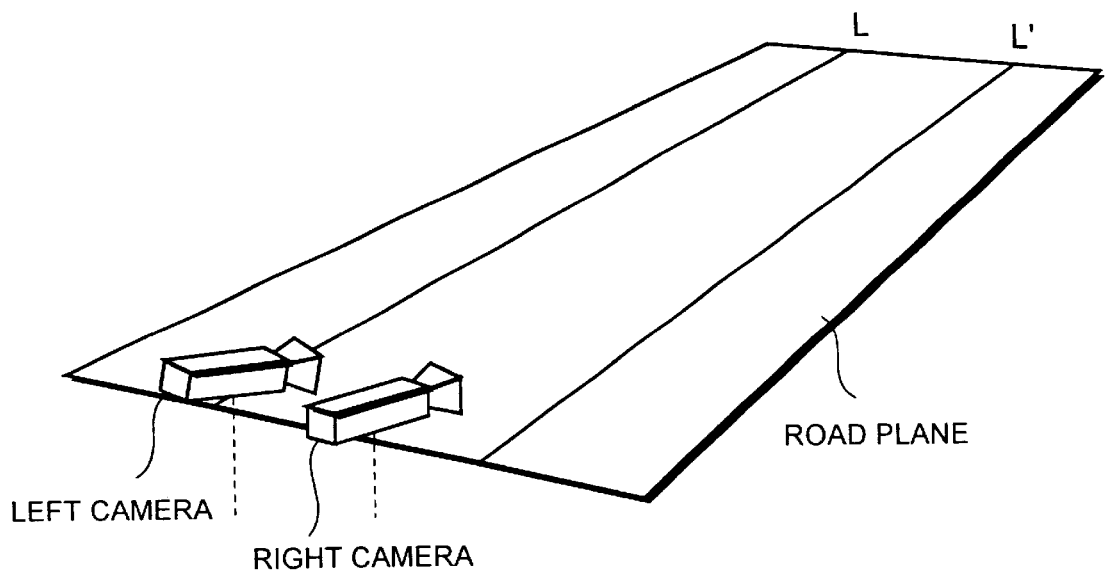
FIG. 2 is a schematic diagram showing a position relation between a road plane and stereo cameras.
Figure 3:
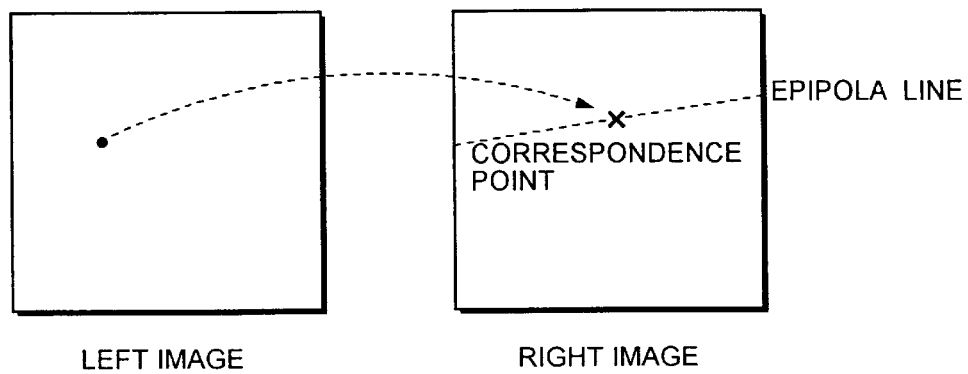
FIG. 3 is a schematic diagram showing an epipola constraint.

First, two cameras (loaded on the vehicle) are located on the road plane as shown in FIG. 2. Two white lines L, L' extend parallelly along the front and rear direction on the plane. The relation of position and posture between the two cameras is not known. However, epipola constraint is previously known and is not changed while the vehicle is running. The epipola constraint is a constraint concluded for general stereo image. As shown in FIG. 3, as for a point on the left image, the corresponding point on the right image is constrained along a predetermined line. This line is called the epipola line. For example, if an optical axis of each camera is located in parallel, a corresponding point of an arbitrary point on the left image exists on the same scan line on the right image, and the epipola line coincides with the scan line. The epipola constraint depends on the relation of posture between stereo cameras and internal parameters of each camera, i.e., a focal distance of the camera lens and the origin of image. Accordingly, constant epipola constraint represents that the relative position relation and the internal parameter of the stereo cameras do not change while running.

The epipola constraint is represented as follows. Assume that an arbitrary point on the left image is (u, v) and the corresponding point on the right image is (u', v'). The following equation (2) is then derived. In this equation (2), [F] is a "3×3" matrix and called a base matrix.

$$(u',v',1)[F](u,v,1)^T=0 \quad (2)$$

The equation (2) is expanded and arranged as following equation (3).

$$(F11u+F12v+F13)u'+(21u+F22v+F23)v'+(F31u+F32v+F33)=0 \quad (3)$$

Figures 4A, 4B:
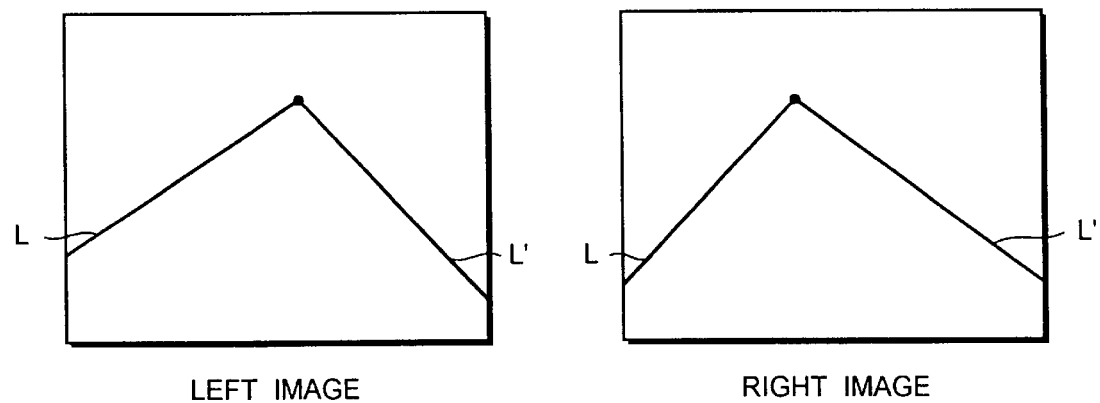
FIGS. 4A and 4B are schematic diagrams showing a calculation method of image transformation parameters.

The equation (3) represents the epipola line on the right image corresponding to a point (u, v) on the left image. In this case, Fij(i, j=1, 2, 3) is an element of j line and i column of the matrix [F] and predetermined from a plurality of pairs of correspondence points. The matrix [F] consists of nine elements. Each element is dependent on each other element. Theoretically, each element is calculated by at least seven pairs of corresponding points. The three-dimensional position of each corresponding point is not necessary. Accordingly, calculation of epipola constraint is relatively easy. As shown in FIGS. 4A and 4B, if two straight lines L and L' are calculated on the left and right images, the straight lines L and L' are parallel in three-dimensional space. However, these lines cross at an infinite distant point called a vanishing point on the images.

Figure 5A:
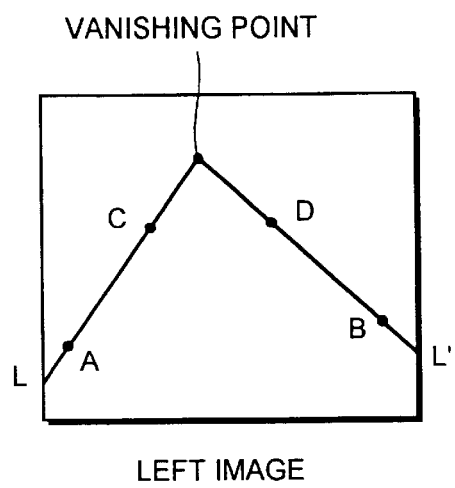
FIGS. 5A and 5B are schematic diagrams showing correspondence points on the left and right images to calculate the image transformation parameters.
Figure 5B:
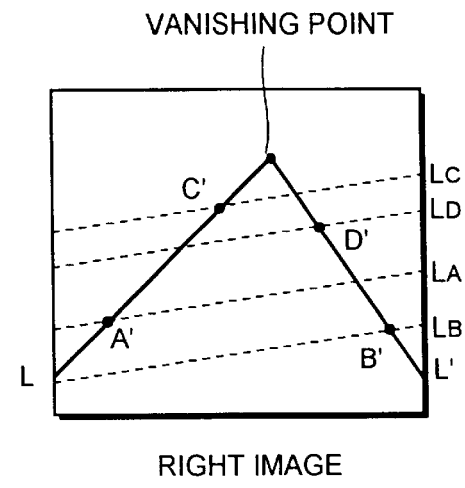

A relation equation among corresponding points on the road plane is calculated. As shown in FIGS. 5A and 5B, assume that two arbitrary points on the straight line L are A and C, and two arbitrary points on the straight line L' are B and D. Each corresponding point A', B', C', D' on the right image is easily calculated using epipola constraint. In short, the correspondence point A' of the point A coincides with a cross point of the straight line L and the epipola line $L_A$ of the point A on the right image. In the same way, the corresponding points B', C', and D' are determined as the cross point of the epipola lines $L_B$, $L_C$, and $L_D$ of the points B, C, and D. Assume that coordinate value of points A, B, C, and D and the correspondence points A', B', C', and D' are (u1, v1), (u2, v2), (u3, v3), (u4, v4), (u1', v1'), (u2', v2'), (u3', v3'), and (u4', v4'). The following equation (4) is derived for (ui, vi) and (ui', vi') (i=1~4).

$$ui' = \frac{h11ui + h12vi + h13}{h31ui + h32vi + h33}, \quad vi' = \frac{H21ui + h22vi + h32}{H31ui + h32vi + h33} \quad (4)$$

These eight equations are solved for $\vec{h}$=(h11, h12, h13, h21, h22, h23, h31, h32, h33) If one solution $\vec{h}$ satisfies the equation (4), k·$\vec{h}$ multiplied by constant k also satisfies the equation (4). In case of "h33=1", the equation (4) does not lose the generality. Accordingly, $\vec{h}$ consisting of nine elements is calculated by eight equations. By using $\vec{h}$=(h11, h12, h13, h21, h22, h23, h31, h32, h33), if arbitrary point P (u, v) on the left image exists on the road plane, the corresponding point P' (u', v') on the right image is calculated as the following equation (5).

$$u' = \frac{h11u + h12v + h13}{h31u + h32v + h33}, \quad v' = \frac{h21u + h22v + h23}{h31u + h32v + h33} \quad (5)$$

Figure 6:
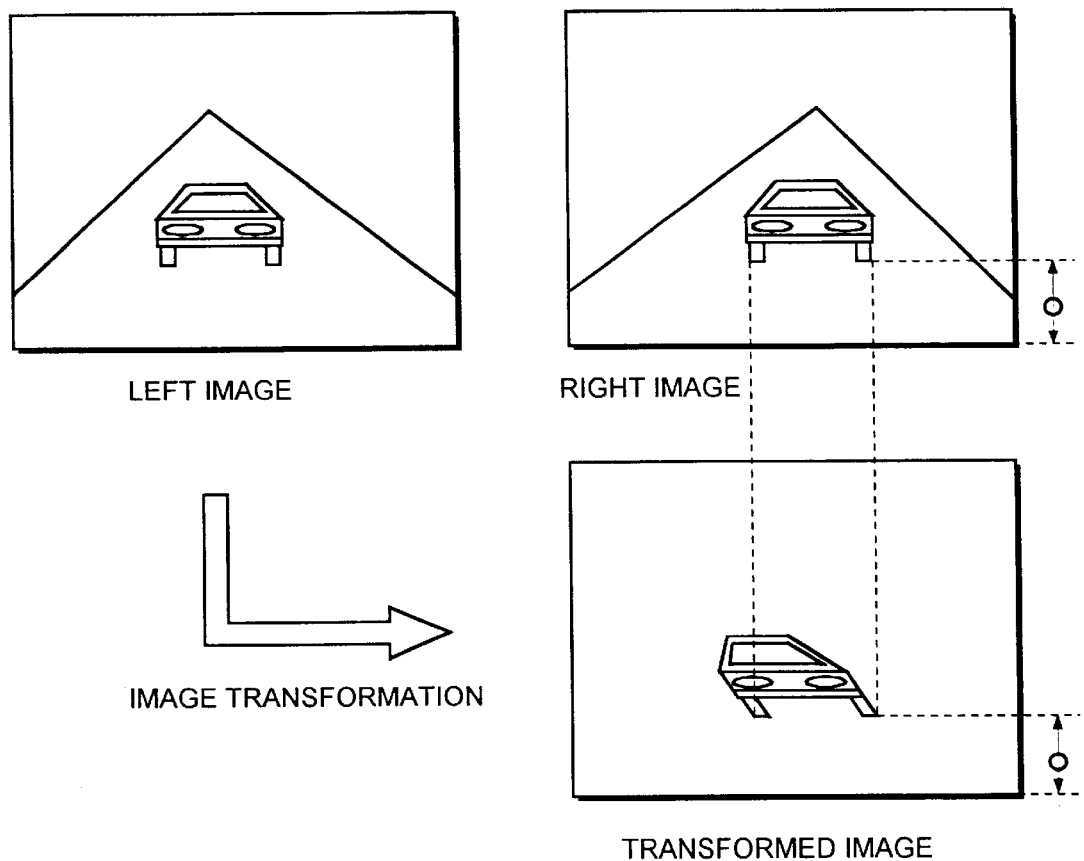
FIG. 6 is a schematic diagram showing characteristics of image transformation and the transformed image.

For example, as shown in FIG. 6, if the left camera image is transformed based on the view position of the right camera, the transformed image (shown in right lower side) is generated. In short, pixels on the road plane in the left image (contact point between the road plane and tires of the front vehicle) are correctly transformed to the correspondence point in the right image. However, an object including the height in the space (the front vehicle) is transformed with distortion falling in the image. Accordingly, if intensities of the points P (u, v) and P' (u', v') are $I_L$ (u, v) and $I_R$ (u', v'), and if the point P (u, v) actually exists on the road plane, the points P and P' are a correct pair of the corresponding points, and the intensities of the points P and P' are the same. Conversely, if the intensity of the points P and P' is different, the points P and P' do not exist on the road plane. If relation between the road plane and the camera is fixed, an evaluation value D is calculated using the following equation (6), and it is decided that the point P of "D≠0" belongs to the obstacle area. Alternatively, a threshold Thr is set in consideration of an error of difference of characteristics of the left and right cameras, and it is decided that the point P of "D>Thr" belongs to the obstacle area.

$$D=|I_L(u,v)-I_R(u',v')|(|\cdot|:\text{absolute value}) \quad (6)$$

However, various changes such as camera vibration from the vehicle's movement and inclination of the road plane actually occur, and it is difficult to decide the obstacle by the equation (6) only. For example, a difference between intensities of a landmark (characters and speed limit displays drawn on the road surface, or patterns such as white lines on the road surface) and the road plane is large, and the assumed geometrical relation between the road and the camera (the relation in case of determining the transformation parameter) is different from actual geometrical relation between the road and the camera. Even if the landmark on the road is not the obstacle, large values are calculated by the equation (6) for edges neighboring the landmark in the image. Accordingly, in the first embodiment, a plurality of suitable postures is selected from all geometrical relations locatable for the vehicle and the road plane, and each transformation parameter for each of the plurality of suitable postures is previously calculated. One camera image is respectively transformed using each transformation parameter, and matching processing is executed between each transformed image and the other camera image. As a result, effects occurred by above transformation error is reduced.

Next, the object detection apparatus of the first embodiment is explained in detail. In FIG. 1, the image input unit 1 inputs two images (the left image and the right image) by using two TV cameras (the left camera and the right camera). In this case, the geometrical relationship of the two cameras and component of the two cameras loaded on the vehicle do not change from the calculation timing of the transformation parameter. The image memory 2 stores two images input by the image input unit 1. The image transformation unit 3 respectively transforms an input image from one camera (In this example, the left image) to an image based on the view position of the other camera (In this example, the right camera) by using each of the plurality of transformation parameters. The image transformation is executed for each transformation parameter and the transformed images are generated. The number of transformed images equals the number of transformation parameters.

The matching processing unit 4 executes matching processing between pixels of each transformed image and corresponding pixels of the other camera image (In this example, the right image) and selects a maximum coincidence degree of each pixel position on the other camera image. As a coincidence degree, the absolute value of difference of each pixel (The smaller the value is, the higher the coincidence degree is.) is used as the following equation (7).

$$M(u, v) = \min_{1 \leq i \leq n} |I_{Ti}(u, v) - I_R(u', v')| \quad (7)$$

In the equation (7), M(u, v) is a coincidence of the pixel coordinate (u, v), $I_{Ti}$ is the left transformed image using i-th transformation parameter, $I_R$ is the right camera image. If the change area of the suitable posture is wide or if the number of transformation parameters used for image transformation is few, the detection error may occur at an edge part of a landmark on the road by using the prepared transformation parameter. Accordingly, the matching processing is executed not as a comparison between corresponding pixels on the left and right images, but as a search between a small area consisting of pixels (a rectangular area obtained by dividing the left image along vertical and horizontal direction) and the corresponding area (search area including the same rectangular area on the right image). As a result, the transformation error is reduced.

Figure 7:
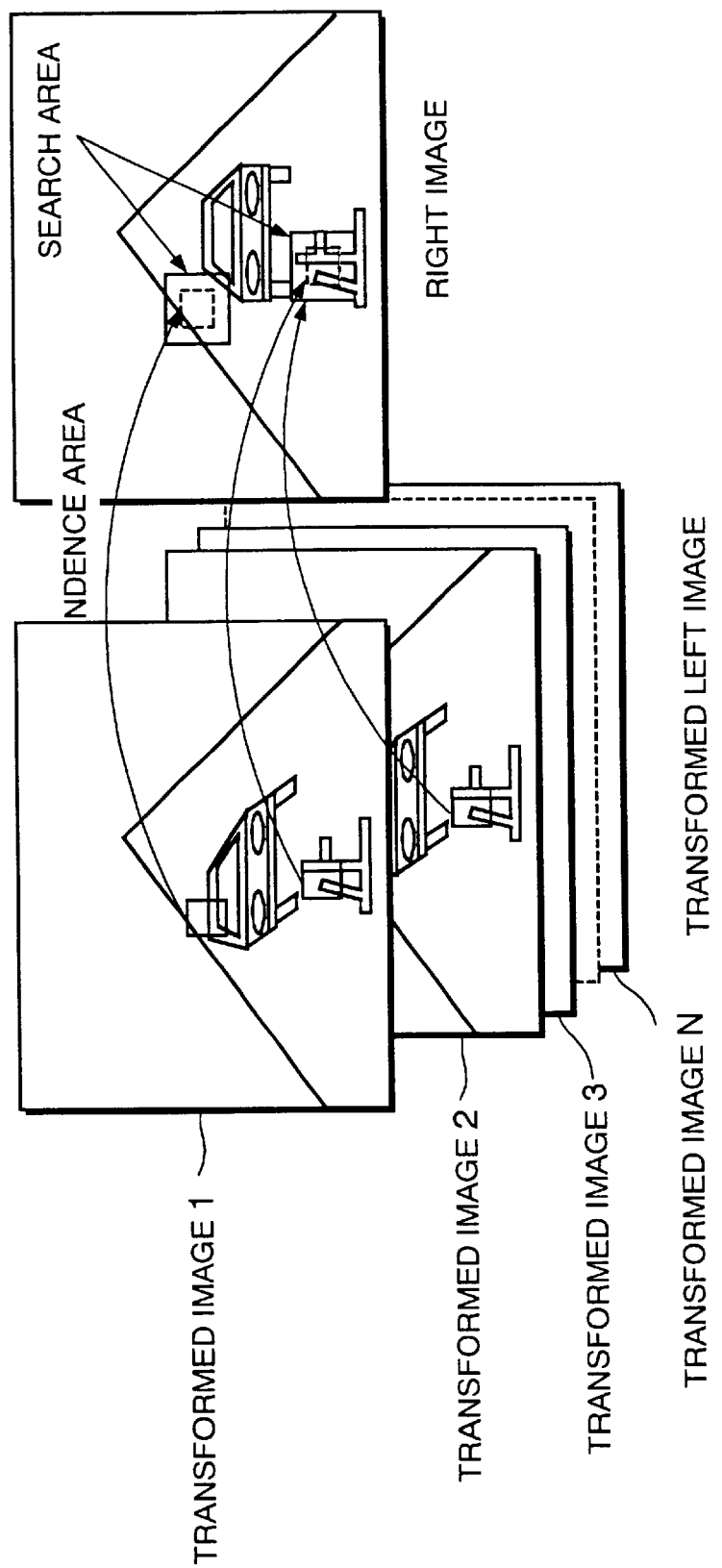
FIG. 7 is a schematic diagram showing the matching processing between the transformed left images and the right image according to the first embodiment.

For example, as shown in FIG. 7, a maximum coincidence degree for some small area on each transformed left image is determined as follows. The small rectangle area on one transformed left image is compared with a search area (surrounding rectangle area including the corresponding small area) on the right image, and the coincidence degree between the small area and the corresponding area in the search area. This processing is repeatedly executed whenever the small area is shifted in the search area by a predetermined pixel pitch. After processing for all shift positions of the small area in the search area, a maximum value is selected from all coincidence degrees of all shift positions. This processing is executed for the same small area of all transformed left images. Last, a maximum coincidence degree is selected from all maximum values of all transformed left images for the same small area. As a result, the maximum coincidence degree corresponds with the search area on the right image. This processing is executed for each small area of all transformed images. Accordingly, the transformation error is reduced for the small area at each position on the image. As for the maximum coincidence degree of each small area of each transformed image, while the correspondence area to be matched is shifted in the search area of the right image by one pixel or plural pixels (For, example, the correspondence area is shifted along spiral course from a center position of the search area), the coincidence degree is repeatedly calculated for each match position. Conversely, the search area may be set on each transformed image.

Figure 8:
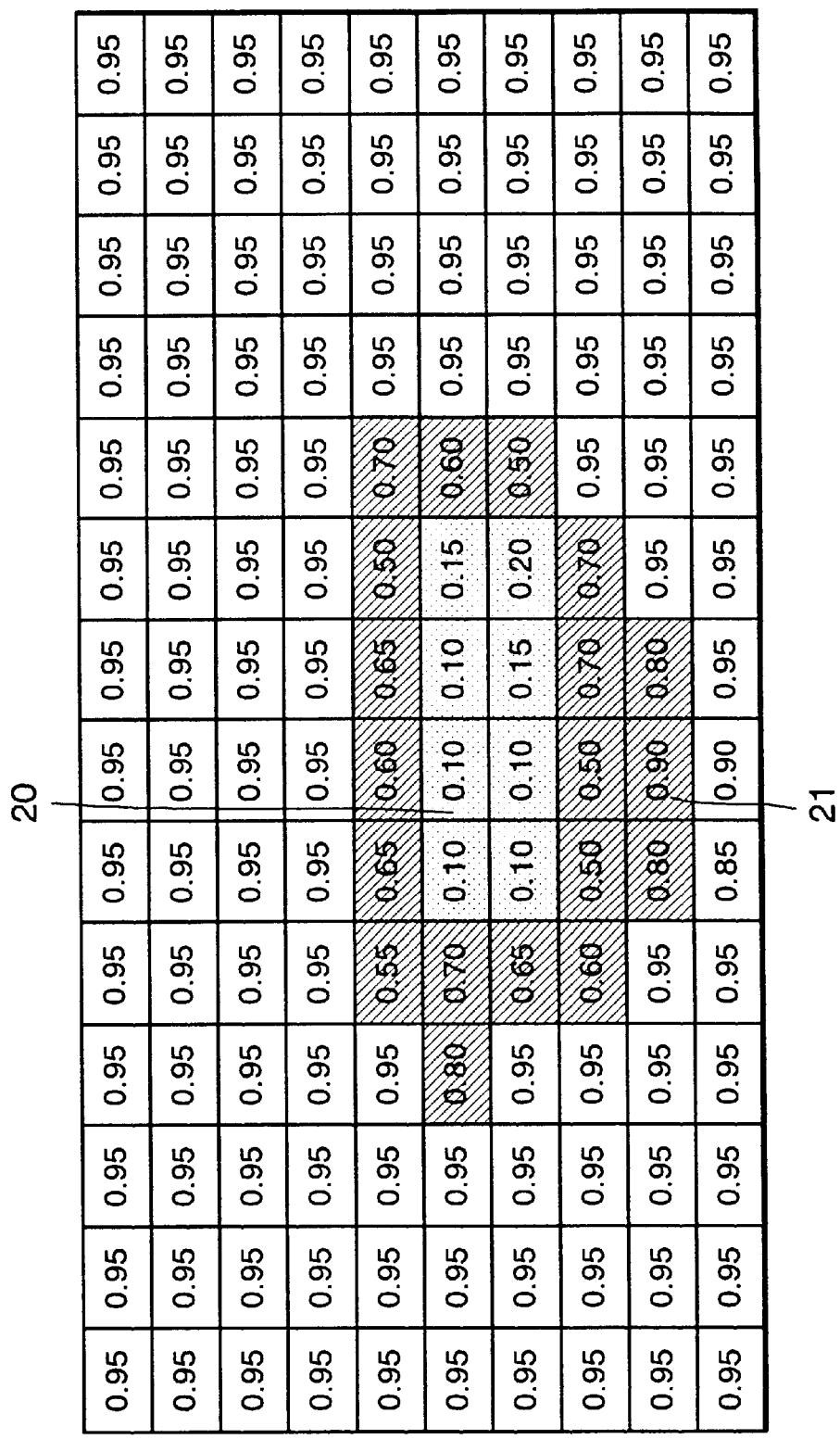
FIG. 8 is a schematic diagram of an example of a coincidence degree image according to the first embodiment.

The search processing of maximum coincidence degree is executed for all small areas of all transformed images. As a result, a two-dimensional image consisting of the maximum coincidence degree of each search area on the right image is created. For example, if a block shape is selected as the small area, and if the block on the transformed left image is shifted in the corresponding search area of the right image, the coincidence degree image is obtained as shown in FIG. 8. In FIG. 8, the coincidence degree M is represented as "(0≦M≦1)" and normalized by step of 0.05.

As mentioned-above, while the road plane is correctly projected onto each transformed image, the object including height such as the front vehicle or the pedestrian is projected onto each transformed image with distortion in proportion to the height from the road plane. Accordingly, even if the transformed image includes a large transformation error, the small areas of the road plane includes large coincidence degree for one transformed image closest to the actual posture between the camera and the road plane. On the other hand, the small area of the high object includes a low coincidence degree for each transformed image, because the posture range of the vehicle is physically constrained and a high coincidence degree is not calculated for each transformed image corresponding to each posture between the vehicle and the camera. As the coincidence degree of each small area in the matching processing, a general matching method such as the normalization function, SAD (Sum of Absolute Difference), SSD (Sum of Square Difference) are utilized. In the normalization function, the larger the coincidence degree is, the larger the function value is. In SAD and SSD, the larger the coincidence degree is, the smaller the sum is.

As mentioned-afterward, the obstacle detection unit 5 detects an area whose coincidence degree is low as the obstacle object. Accordingly, in case that the maximum coincidence degree is detected by shifting one small area of one left transformed image in the search area of the right image, when a coincidence degree above a threshold is obtained, the matching processing for the one small area of all transformed images is completed at this timing. If the coincidence degree is regarded as the maximum coincidence degree of the one small area of all transformed images, the matching processing is executed at high speed (Alternatively, when a coincidence degree above the threshold is obtained, the matching processing for the one small area of the one left transformed image is completed at this timing and the coincidence degree is regarded as the maximum coincidence degree of the one small area of the one left transformed image.).

For example, even if the present transformation parameter is different from a suitable transformation parameter guided from the actual relation between the camera and the road plane and the error arises for the transformation of the left camera image, the search area of the right image corresponding to the road plane without texture does not include the texture. In such area, even if the matching processing is completed halfway, for the search area, this processing result is not largely different from the result obtained by the matching processing for all of the search area. As a result, obstacle detection ability does not decrease.

In the above explanation, irrespective of the position of the small area on the image, a size of the search area, a shift pitch of pixels for searching, and a number of the transformed images (a number of type of transformation parameters) are fixed. However, all or part of them may be continuously changed in proportion to the position of the small area on the image, especially the position along the top and bottom of the image (The bottom part of the image closest to the vehicle and the top part of the image furthest from the vehicle.). For example, the size of the search area may become large in proportion to the lower area of the image (area near the vehicle) and may become small in proportion to the upper area of the image (area far from the vehicle). Furthermore, the shift pitch of pixels for searching may be small in proportion to the lower area of the image (area near the vehicle) and may be large in proportion to the upper area of the image (area far from the vehicle). Alternatively, the searching may be finely executed in proportion to the lower area of the image (area near the vehicle) and may be roughly executed in proportion to the upper area of the image (area far from the vehicle). Furthermore, the number of transformed images may be larger in proportion to the lower area of the image (area near the vehicle) and may be smaller in proportion to the upper area of the image (area far from the vehicle).

The obstacle detection unit 5 executes threshold processing for coincidence degree image (shown in FIG. 8) generated by the matching processing unit 4 and outputs the small areas including low coincidence degrees as the obstacle area on the image. In FIG. 8, if the threshold is 0.25, the first hatching area 20 is detected as the obstacle area. The second hatching area 21 represents a part whose coincidence degree is below 0.80. This detection result of the obstacle is utilized for automatic running of the vehicle and evasion of danger.

As mentioned-above, in the first embodiment, the obstacle is detected using the height of the object on the road plane. Accordingly, without effect of change of brightness and shadow, the obstacle such as the preceding vehicle or the pedestrian is detected from the image. Especially, in the processing that the road surface is assumed as plane, component that a plurality of road surfaces are assumed and the transformation error is reduced is also included. Accordingly, vibration of the camera and inclination of the road surface do not affect the detection.

Furthermore, in the first embodiment, the coincidence degree calculated by the matching processing unit 4 is represented as a two-dimensional coincidence image. However, whenever the maximum coincidence degree of each small area is calculated, the threshold processing may be executed and the small area may be output by the obstacle area.

Next, the obstacle detection apparatus of the second embodiment is explained. In the second embodiment, one image input by the first camera is transformed from a view position of the second camera by using only one transformation parameter, and only one transformed image is generated. The one transformation parameter is a standard parameter representing a typical geometrical relation between two cameras and the road plane. For example, the typical geometrical relation is a condition that a still vehicle is located on the road surface without inclination.

The block diagram of the obstacle detection apparatus of the second embodiment is shown in FIG. 1 in the same way as the first embodiment. The image input unit 1 simultaneously inputs two images (the left camera image and the right camera image) of the area in front of the vehicle from two TV cameras (the left TV camera and the right TV camera). The image memory 2 stores the two images input by the image input unit 1. Next, the image transformation unit 3 reads the left image from the image memory 2, and transforms the left image from a view position of the right TV camera by using the standard transformation parameter. In short, only one transformed left image is generated. In the same way as in the first embodiment, each small area (one pixel or a plurality of pixels) on the left image is transformed to a predetermined area (one pixel or a plurality of pixels) on the epipola line corresponding to each small area. Hereinafter, the image transformation that the left camera image is transformed from a view position of the right TV camera is explained. However, the right camera image may be transformed from a view position of the left TV camera.

Figure 9:
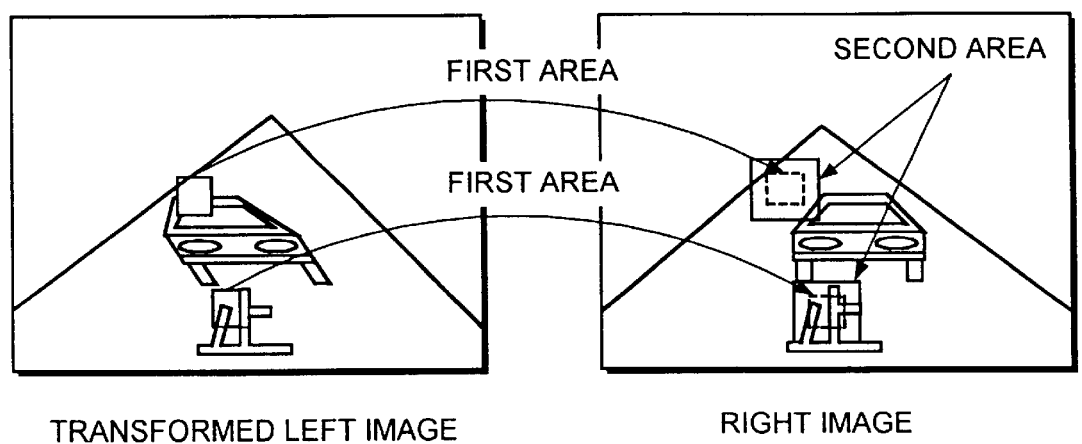
FIG. 9 is a schematic diagram showing a matching processing between one transformed left image and the right image according to the second embodiment.

As shown in FIG. 9, the matching processing unit 4 executes matching processing between each first area (small area) of the transformed left image and the corresponding second area (search area) of the right image. A position corresponding to the first area in the second area is called a matching area. A plurality of matching areas corresponding to each shift position is included in each second area. The first area and the second area are respectively a rectangle area consisting of one pixel or a plurality of pixels. However, a size of the first area is smaller than a size of the second area.

In FIG. 9, the road plane is correctly projected onto the transformed left image. However, an object having a height such as the front of a vehicle or a pedestrian are projected with large distortion in proportion to the height from the road plane. Accordingly, the first area corresponding to the road plane includes a large coincidence degree and the first area corresponding to the high object includes a small coincidence degree. In the matching processing, whenever the first area is shifted to each position of the matching area in the second area, a coincidence degree between the first area and the matching area in the second area is calculated, and a maximum coincidence degree is selected from coincidence degrees corresponding to all matching areas in the second area. The maximum coincidence degree is regarded as corresponding to the first area in the transformed left image. As for calculation of the coincidence degree, various kinds of matching methods such as normalized correlation, SAD (Sum of Absolute Difference), SSD (Sum of Squared Difference) are selectively utilized. In this case, the higher the coincidence degree is, the larger the value of the normalization correlation is. On the other hand, the higher the coincidence degree is, the smaller the value of SAD and SSD is.

While the first area is shifted to the position of each matching area in the second area, the previous matching area and the present matching area in the second area may be partially overlapped or may not be overlapped. In the former case, the first area is shifted by partially overlapping with the previous first area in the second area. In the latter case, the first area is shifted neighboring with the previous first area without overlapping.

When the matching processing between the first area and the second area is completed, the matching processing between another first area and a second area corresponding to another first area is executed. In this way, the matching processing is executed for all first areas in the transformed left image. In this case, the second areas corresponding to different first areas may be partially overlapped or may be neighbored without overlapping. Furthermore, all areas of the transformed left image may be set as a plurality of first areas, or a plurality of positions suitable for the first area in the transformed left image may be set as each first area.

Figure 10:
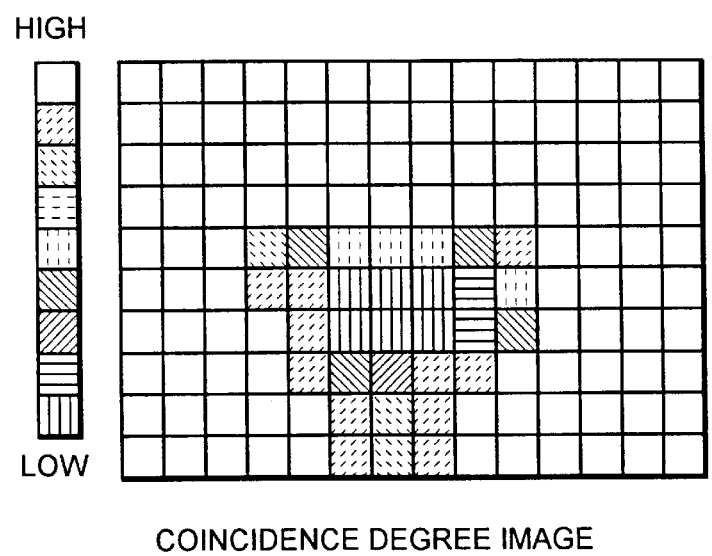
FIG. 10 is a schematic diagram of an example of a coincidence degree image according to the second embodiment.

When the matching processing for all first areas in the transformed left image is completed, a two-dimensional image consisting of maximum coincidence degrees for each first area is generated as shown in FIG. 10. This two-dimensional image is called a coincidence degree image.

Next, the obstacle detection unit 5 executes threshold processing for the coincidence degree image generated by the matching processing unit 4 and extracts the area whose coincidence degree is below a threshold as the obstacle area from the coincidence degree image. As for the threshold, the following methods are selectively used.

(1) The value obtained from the user's experience is set as the threshold.

(2) A range of coincidence degrees stored in the coincidence degree image is divided into nine steps. For example, the fourth coincidence degree from the lowest coincidence degree is set as the threshold.

(3) An operator driving the vehicle sets an arbitrary coincidence degree as the threshold from the coincidence degree image.

(4) The largest area (most frequent coincidence degree) in the coincidence degree image is decided as the road plane. Accordingly, the other coincidence degree except for the largest area is set as the threshold.

Furthermore, the matching processing unit 4 generates a two-dimensional image consisting of the maximum coincidence degrees for each first area. However, the above-mentioned threshold is preset. Whenever the coincidence degree is obtained for each first area, the coincidence degree below the threshold may immediately output as one element of the two-dimensional image.

Furthermore, the obstacle detection unit 5 detects the area whose coincidence degree is below the threshold as the obstacle area. Accordingly, whenever a coincidence degree between the first area and one matching area in the second area is calculated, if the coincidence degree is above the threshold, this coincidence degree is regarded as a maximum coincidence degree of the first area, and the matching processing between the first area and the other matching areas in the second area may not be executed.

Furthermore, obstacle information detected by the obstacle detection unit 5 may be selectively presented to the user through a hearing means such as speech, a visual means such as light, or a bodily sensation means such as vibration.

As mentioned-above, in the second embodiment, even if the vehicle is running on a road plane, without effect of change of illumination and shadow of the front vehicle, the obstacle is stably detected by reducing the effect of vibration of the vehicle and inclination of the road. Furthermore, by warning of the existence of the obstacle to the user, the user can avoid accidents with the obstacle. Furthermore, in case of the matching processing, the calculation time reduces by setting the threshold, and the obstacle is detected at high speed. For example, if an error arises between the prepared transformation parameter and a suitable transformation parameter as actual relation for the camera and the road plane, and if an error arises the transformation of the left camera image, the second area corresponding to the road plane without texture in the right camera image does not often include the texture. In such area, even if the matching processing is completed halfway for the second area, this processing result is not largely different from the result obtained by the matching processing for all of the second area. As a result, ability of obstacle detection does not fall.

Furthermore, in the second embodiment, a plane is assumed as the road surface. However, a curved surface may be assumed as the road. In this case, the curved surface is approximated as a plurality of sectional planes; a transformation parameter is prepared for each sectional plane; and the image of each section is transformed using each transformation parameter in order to detect the obstacle.

Furthermore, each component element such as the matching processing unit is easily realized as hardware or parallel processing. Especially, in recent processors, by using SIMD (Single Instruction stream Multiple Date stream) operation function to process multimedia data at high speed, each component element is easily realized as quick operation.

Furthermore, the sizes of the first area and the second area may not be fixed. This size is suitably changed if only the coincidence degree between the first area and the second area is calculated.

A memory device, including a CD-ROM, floppy disk, hard disk, magnetic tape, or semiconductor memory can be used to store instructions for causing a processor or computer to perform the process described above.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An obstacle detection apparatus, comprising:

a first camera and a second camera each configured to input images, the first camera and the second camera being disposed on a moving object on a road plane, a view position of the first camera being different from a view position of the second camera on the moving object;

an image memory configured to store a plurality of images input through the first camera and the second camera;

an image transformation unit configured to transform an image input through the first camera into a plurality of transformed images using each transformation parameters previously calculated based on different geometrical relationships among the road plane, the first camera and the second camera, wherein each transformation parameter differently represents a transformation from the view position of the second camera;

a matching processing unit configured to compare each area of the same position in each of the plurality of transformed images with a corresponding area of the same position in another image input through the second camera, to calculate coincidence degrees of compared areas of the same position between each transformed image and another image, and to select a maximum coincidence degree from the coincidence degrees of the compared areas of the same position; and an obstacle detection unit configured to detect an obstacle area based on areas having the maximum coincidence degree in which the maximum coincidence degree is below a threshold.

2. An obstacle detection method, comprising:

inputting images through a first camera and a second camera, the first camera and the second camera being disposed on a moving object on a road plane, a view position of the first camera being different from a view position of the second camera on the moving object;

storing a plurality of images input through the first camera and the second camera;

transforming an image input through the first camera into a plurality of transformed images using each transformation parameter previously calculated based on different geometrical relationships among the road plane, the first and the second camera, wherein each transformation parameter differently represents a transformation from the view position of the second camera;

comparing each area of the same position in each of the plurality of transformed images with a corresponding areas of the same position in another image input through the second camera;

calculating coincidence degrees of compared areas of the same position;

selecting a maximum coincidence degree from the coincidence degrees of the compared areas of the same position; and detecting an obstacle area based on areas having the maximum coincidence degree in which the maximum coincidence degree is below a threshold.

3. A computer-readable memory containing computer-readable instructions, comprising:

an instruction unit to input images through a first camera and a second camera, the first camera and the second camera being disposed on a moving object on a road plane, a view position of the first camera being different from a view position of the second camera on the moving object;

an instruction unit to store a plurality of images input through the first camera and the second camera;

an instruction unit to transform an image input through the first camera into a plurality of transformed images using each transformation parameter previously calculated based on different geometrical relationships among the road plane, the first camera and the second camera, wherein each transformation parameter differently represents a transformation from the view position of the second camera;

an instruction unit to compare each area of the same position in each of the plurality of transformed images with a corresponding area of the same position in another image input through the second camera;

an instruction unit to calculate coincidence degrees of compared areas of the same position between each transformed image and another image;

an instruction unit to select a maximum coincidence degree from the coincidence degrees of the compared areas of the same position; and an instruction unit to detect an obstacle area based on areas having the maximum coincidence degree in which the maximum coincidence degree is below a threshold.

4. The obstacle detection apparatus according to claim 1, wherein the first camera is one of a left camera and a right camera on a vehicle, and the second camera is the other of the left camera and the right camera, and wherein the left camera and the right camera respectively take a left image and a right image of front area along an advance direction of the vehicle.

5. The obstacle detection apparatus according to claim 4, wherein an optical axis of the left camera and an optical axis of the right camera are parallel along the advance direction of the vehicle.

6. The obstacle detection apparatus according to claim 4, wherein the plurality of transformation parameters respectively represents a different transformation from the view position of the second camera based on a different posture of the vehicle on the road plane, and each transformation parameter is previously calculated based on a geometrical relationship among the road plane, the left camera, and the right camera in correspondence with each posture of the vehicle.

7. The obstacle detection apparatus according to claim 4, wherein said image transformation unit transforms one of the left image and the right image into a plurality of images by using each transformation parameter from the view position of the other of the left camera and the right camera.

8. The obstacle detection apparatus according to claim 1, wherein said image transformation unit transforms the one image by using a standard transformation parameter, and generates one transformed image from the view position of the second camera.

9. The obstacle detection apparatus according to claim 1, wherein said matching processing unit divides each transformed image into a plurality of areas, compares each area with a search area including a correspondence area of the same position on another image by shifting the correspondence area in the search area, calculates coincidence degrees between the area and the correspondence area for each shift position, and selects a maximum value from the coincidence degrees between the area and the correspondence area for all shift positions.

10. The obstacle detection apparatus according to claim 9, wherein said matching processing unit selects a maximum coincidence degree from maximum values of each area of the same position of all transformed images, and creates a coincidence degree image consisting of maximum coincidence degrees of each area.

11. The obstacle detection apparatus according to claim 9, wherein, if a coincidence degree of one shift position for an area of one transformed image is above a threshold, said matching processing unit selects the coincidence degree as the maximum coincidence degree of the area and completes the matching processing for the area of the same position of all transformed images.

12. The obstacle detection apparatus according to claim 9, wherein at least one of a size of the search area, a shift pitch of pixels in the search area, and a number of the plurality of transformation parameters, is changed according to a position of the area on the transformed image.

13. The obstacle detection method according to claim 2, wherein the first camera is one of a left camera and a right camera on a vehicle, and the second camera is the other of the left camera and the right camera, and wherein the left camera and the right camera respectively take a left image and a right image of front area along an advance direction of the vehicle.

14. The obstacle detection method according to claim 13, wherein an optical axis of the left camera and an optical axis of the right camera are parallel along the advance direction of the vehicle.

15. The obstacle detection method according to claim 13, wherein the plurality of transformation parameters respectively represents a different transformation from the view position of the second camera based on a different posture of the vehicle on the road plane, and each transformation parameter is previously calculated based on a geometrical relationship among the road plane, the left camera, and the right camera in correspondence with each posture of the vehicle.

16. The obstacle detection method according to claim 13, further comprising:

transforming one of the left image and the right images into a plurality of images by using each transformation parameter from the view position of the other of the left camera and the right camera.

17. The obstacle detection method according to claim 2, further comprising:

transforming the one image by using a standard transformation parameter; and generating one transformed image from the view position of the second camera.

18. The obstacle detection method according to claim 2, further comprising:

dividing each transformed image into a plurality of areas;

comparing each area with a search area including a correspondence area of the same position on another image by shifting the correspondence area in the search area;

calculating coincidence degrees between the area and the correspondence area for each shift position; and selecting a maximum value from the coincidence degrees between the area and the correspondence area for all shift positions.

19. The obstacle detection method according to claim 18, further comprising:

selecting a maximum coincidence degree from maximum values of each area of the same position of all transformed images; and creating a coincidence degree image consisting of maximum coincidence degrees of each area.

20. The obstacle detection method according to claim 18, further comprising:

if a coincidence degree of one shift position for an area of one transformed image is above a threshold, selecting the coincidence degree as the maximum coincidence degree of the area; and completing the matching processing for the area of the same position of all transformed images.

21. The obstacle detection method according to claim 18, wherein at least one of a size of the search area, a shift pitch of pixels in the search area, and a number of the plurality of transformation parameters is changed according to a position of the area on the transformed image.

* * * * *